United States Patent [19]

Marijnissen et al.

[11] Patent Number: 4,486,204
[45] Date of Patent: Dec. 4, 1984

[54] FILTER CASING FOR AN AIR CONDITIONING SYSTEM

[75] Inventors: Gerard J. Marijnissen, Groot-Ammers; Robert Schenk, Voorburg, both of Netherlands

[73] Assignee: Installatiegroep van Buuren-Van Swaay B.V., Zoetermeer, Netherlands

[21] Appl. No.: 380,833

[22] Filed: May 21, 1982

[30] Foreign Application Priority Data

May 21, 1981 [NL] Netherlands ............... 8102505

[51] Int. Cl.³ ............ B01D 50/00; B01D 51/00; B01D 53/14
[52] U.S. Cl. ............ 55/267; 55/316; 55/343; 55/350; 55/472; 55/473; 55/478; 55/493; 55/504
[58] Field of Search ......... 55/316, 472, 473, 478, 55/267, 343, 350, 481, 482, 493, 504, 387

[56] References Cited

U.S. PATENT DOCUMENTS

| 1,954,456 | 4/1934 | Morse et al. | |
| 2,375,608 | 5/1945 | Young | 55/472 X |
| 3,477,211 | 11/1969 | Pietsch | 55/472 X |
| 3,509,697 | 5/1970 | Dewey et al. | 55/316 X |
| 3,672,126 | 6/1972 | Goettle | 55/316 X |
| 3,757,495 | 9/1973 | Sievers | 55/316 X |
| 3,795,092 | 3/1974 | Schwartz et al. | 55/473 |
| 3,804,942 | 4/1974 | Kato et al. | 55/316 X |

FOREIGN PATENT DOCUMENTS

| 1448873 | 7/1966 | France. | |
| 93355 | 2/1969 | France. | |
| 150738 | 11/1921 | United Kingdom | 55/316 |
| 490207 | 8/1938 | United Kingdom. | |
| 928471 | 6/1963 | United Kingdom. | |

Primary Examiner—Kathleen J. Prunner
Attorney, Agent, or Firm—Richards, Harris & Medlock

[57] ABSTRACT

A filter casing for an air conditioning system includes exterior walls (1, 2, 2′, 3 and 4) together with a front cover which comprises a plurality of doors (34, 35, 36, 37 and 38). The walls (1, 2, 2′, 3 and 4) and doors (34, 35, 36, 37 and 38) form the casing which is divided into two compartments by parallel partitions (9, 9′). Air is drawn through an intake opening (39), through a channel (10) and sequentially passed through a temperature control apparatus (14), a filter (15) and a fan (16). The air is then transmitted through a fan outlet duct (20) to a channel (22). A plurality of absorption filter elements (23) receive the air from channel (22) and serve to remove contaminating agents. After the air is passed through the filter elements (23), it is directed into passageways (40 and 41) which are open to a rear space (42). From the rear space (42) the filtered air is exhausted from the casing through an outlet (30).

4 Claims, 5 Drawing Figures

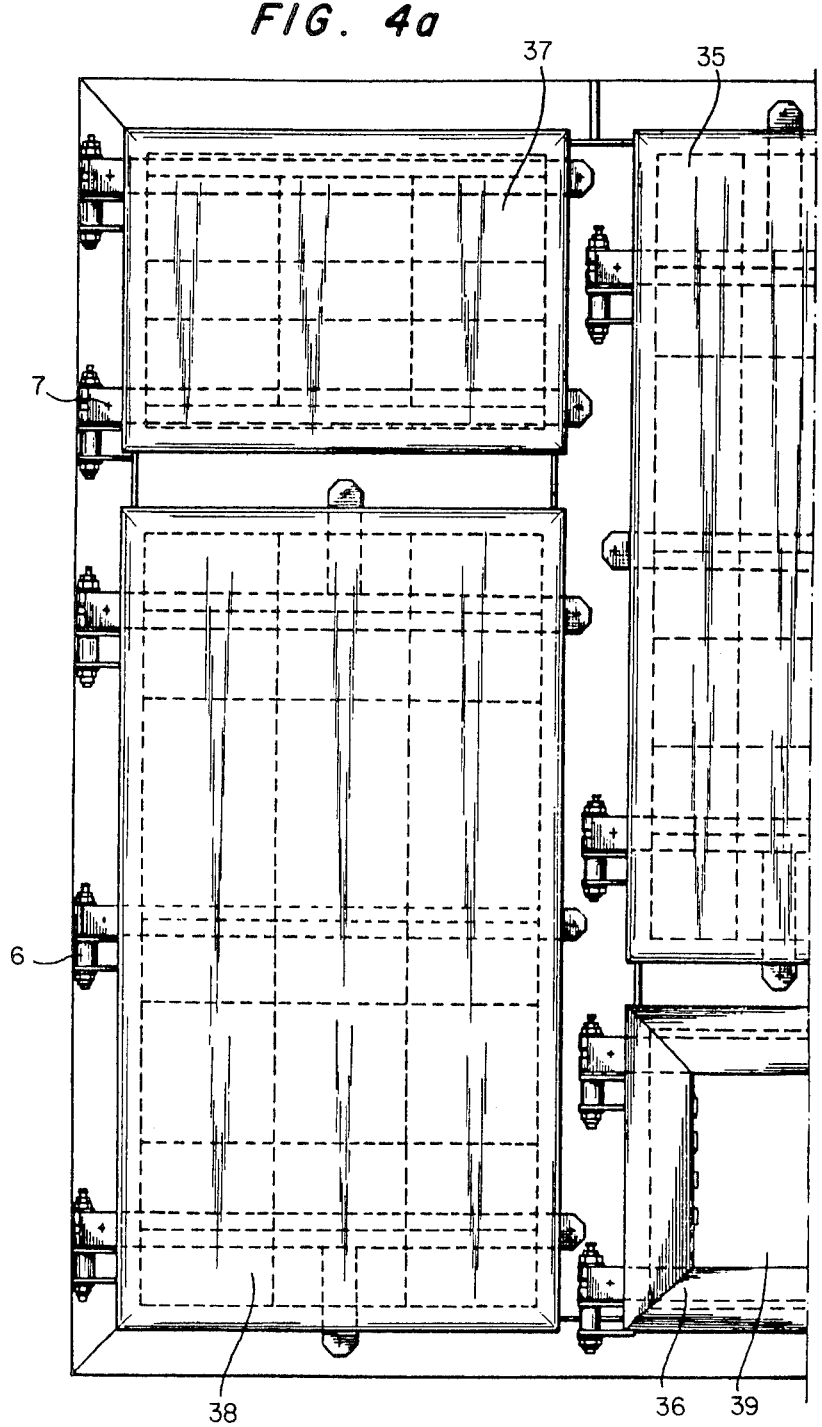

FILTER CASING FOR AN AIR CONDITIONING SYSTEM

The invention relates to a filter casing for a aircondi-tioning system comprising a substantially closed casing having two pairs of parallel side walls, a rear wall and a front cover, in which a fan is mounted of which the discharge side is in communication with an outlet opening in a wall of the casing and the suction side is in communication with a suction opening in a wall of the casing through a passage in which an apparatus for filtering the sucked air is provided for removing solid particles from said air. Such a filter casing is generally known.

The object of the invention is to provide a filter casing having filter elements through which the air flows before said air flows out of the blow out case, in which said filter elements can remove nuclearly, biologically and chemically contaminated substances from the air. In particular the object of the invention is to provide such a filter casing, which may be used in the air conditioning system for a warship in which the filter casing is tied to certain maximal sizes.

This object is achieved in that in the filter casing according to the invention the casing is divided into a first and a second compartment by a pair of partitions extending in spaced apart relation parallel to each other and to a pair of side walls of the casing, between the other pair of side walls of the casing and enclosing a channel which through an aperture in one of said partitions and located near a side wall of the other pair is in communication with a space adjacent to said partition and closed with respect to the remaining part of the second compartment of the casing and in which the air suction opening opens, whereas through an aperture provided in the other partition near the other opposite side wall of the casing, said channel is in communication with the first compartment of the casing, in which an apparatus for controlling the temperature, the apparatus for filtering the intake air and the fan are located, the discharge side of said fan being connected to a discharge duct extending through the channel and the closed space and opening into a second channel extending parallel to the first channel and defined at the one side by the side of the closed space and a side of at least one filter element for absorbing aggressive gases arranged above said space, and at the other side by the sides of one or more further filter elements through which filter elements air is permitted to flow from the said sides to the opposite sides of the filter elements which latter sides define two passageways with the opposite partition and the opposite side wall of the casing respectively, which passageways are throughout their lengths in open communication with a space between the rear wall of the casing and the rear walls of the filter elements in which space the outlet provided in the rear wall opens.

In this way a complete filter casing is obtained having filter elements and measuring and controlling apparatus and having such sizes that the casing may be filled into a space in a wall of a warship destined thereto, so that no separate spaces in the ship are necessary for arranging separate parts.

The apparatus for controlling the temperature of the intake air is necessary because said temperature is not allowed to decrease below a certain value, as otherwise the operation of the filters is affected adversely and is not allowed to exceed a certain value for a limitation of the relative humidity of the air.

Preferably the front cover of the casing is at least partially constituted by a set of doors, so that with opened doors the filter apparatus and the filter elements can be moved into and out of the casing, pressing means being provided by which the filter elements are urged with their respective sides against abutment frames for enclosing the second channel.

In this way the filter apparatus and the filter elements can be simply removed from the outside of the casing and rendered harmless immediately thereafter if the filters are loaded with nuclearly, biologically and/or chemically contaminated substances, so that it is not necessary to transport contaminated filters through the ship, while the casing is arranged such that contaminated air is prevented from leaking inwards.

Advantageously each of the pressing means is formed by a pair of eccentric discs mounted on a rotatable shaft extending perpendicular to the rear wall of the casing, and provided with an abutting face at the location most remote in radial direction of the shaft, which face can be brought into engagement with an edge of the filter element by rotating the shaft by means of an operating lever provided at the end of the shaft opposite of the door. Preferably at the inner side of the doors, a protruding stop means is fixed projecting behind the lever in the closed position of the doors so that the lever is prevented from rotating in that direction, in which the abutting faces of the eccentric discs are released from the filter elements.

In this way it is excluded that the filter elements become loose and that contaminated air flows from the second channel along the filter elements into the spaces to be vented.

The invention is described in detail with reference to the embodiment shown in the drawing.

FIG. 4a and FIG. 4b are front elevation views of the filter casing according to the invention wherein the doors are shown in the closed position.

Figure 1:
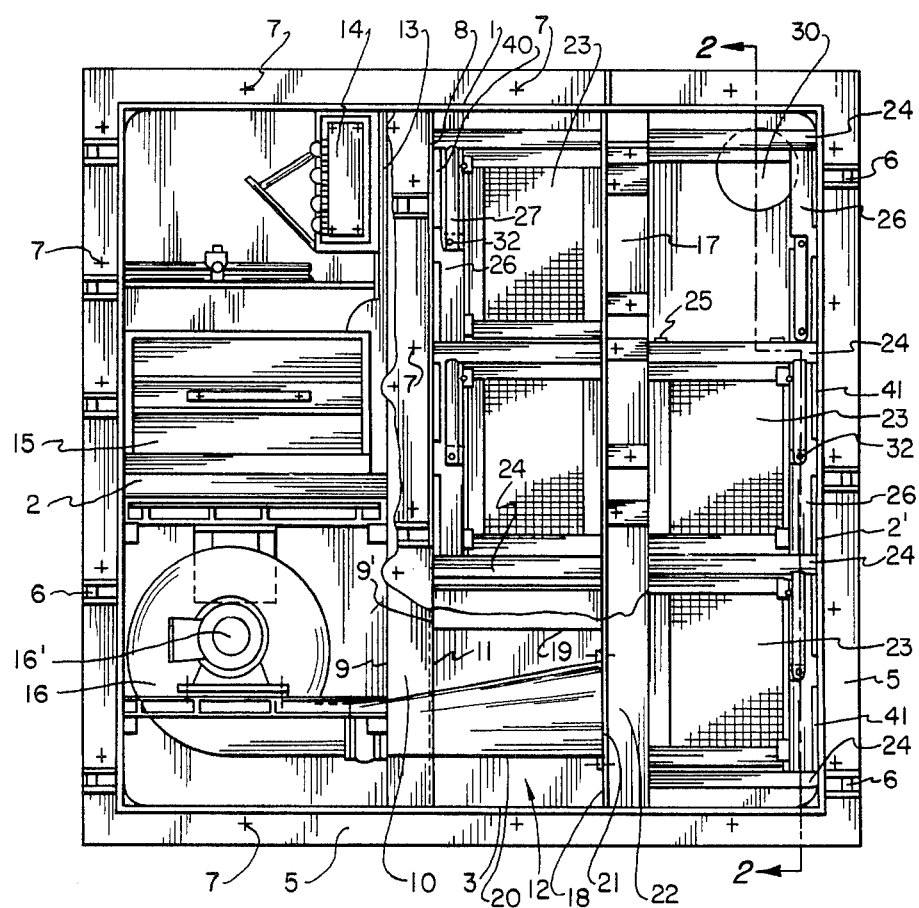
FIG. 1 shows in front view a filter casing according to the invention, in which the doors are removed.
Figure 2:
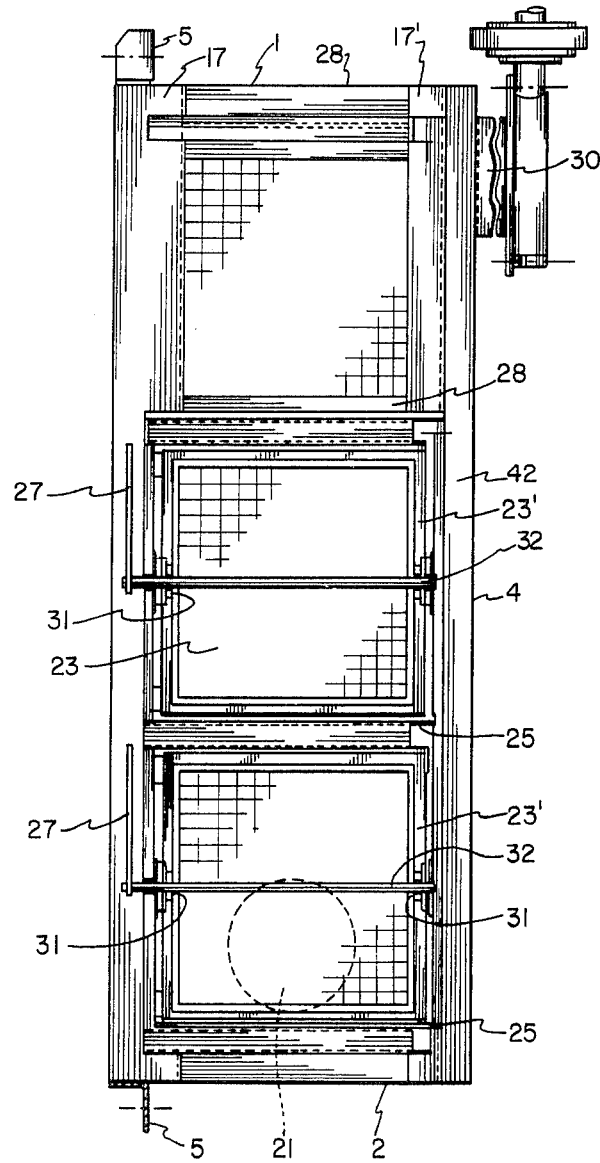
FIG. 2 is a cross-section according to the line II—II in FIG. 1.
Figure 4B:
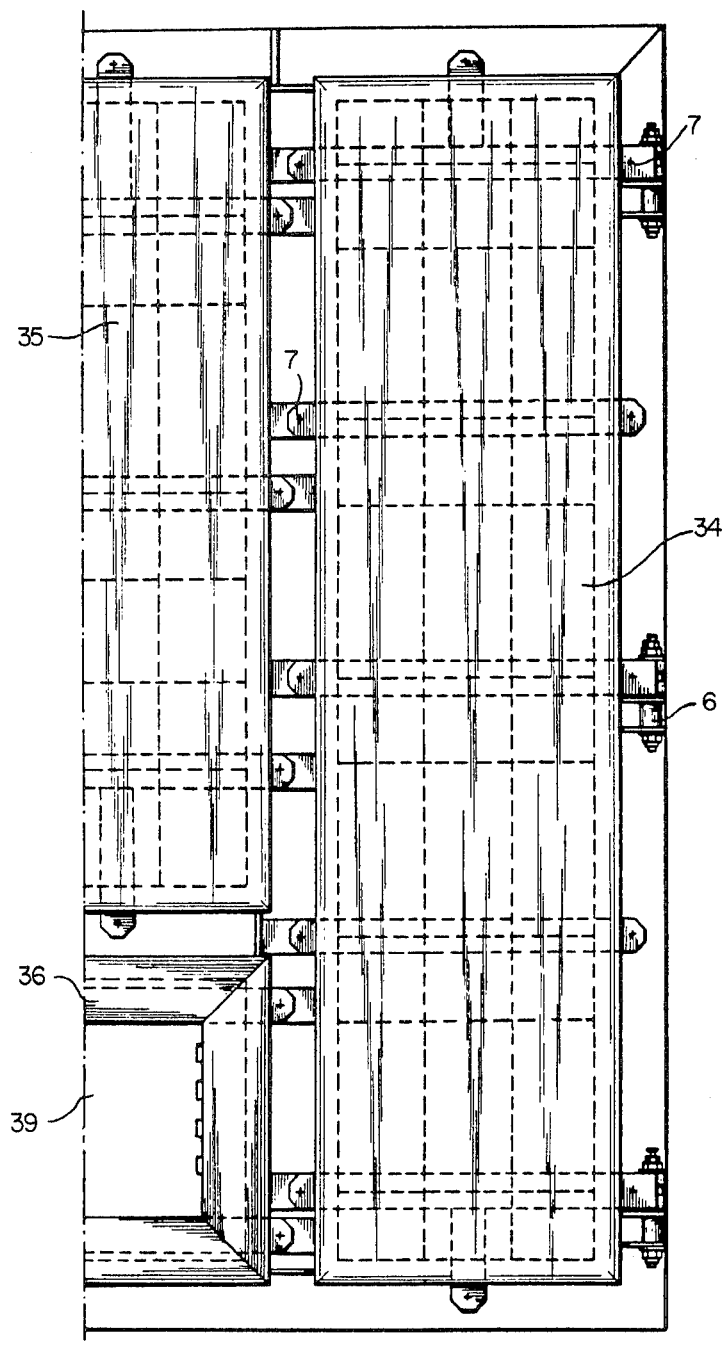

As shown in the FIGS. 1 and 2 the casing comprises an upper wall 1, side walls 2 and 2′, a bottom wall 3 and a rear wall 4, reinforcing profiles 5 being provided around the casing at the front side, which serve also for building in of the casing into a wall of a ship. To the reinforcing profiles hinges 6 are fixed for doors 34, 35, 36, 37 and 38, see FIGS. 4a and 4b, which in their closed positions are locked and urged against the casing at the points 7.

In the casing near its front and rear sides the uprights 8 consisting of a U profile are provided to which uprights the plates 9 and 9′ are fixed to serve as partitions and which enclose a first channel 10. Thus, by the plates 9 and 9′ the casing is divided in a first compartment at the left hand in FIG. 1 and a second compartment at the right hand in FIG. 1.

In the plate 9′ an aperture 11 is provided, through which aperture 11 the channel 10 communicates with the space 12 closed at the front side by a door 36 in which an intake opening 39 is formed. In the plate 9 near the upper side of the casing an aperture 13 is provided through which aperture the channel 10 communicates with said first compartment of the casing, in which compartment are mounted an apparatus 14 for controlling the temperature of the intake air, a simply removable apparatus 15 for filtering said air in order to remove solid particles therefrom, and a fan 16.

Further, in the casing a second pair of uprights 17 and 17' are provided consisting of a U profile. At the bottom side of the casing a plate 18 is fixed between the uprights 17 and 17' and between the pairs of uprights 8 and 17, 17' respectively a horizontal extending plate 19 is fixed so that the closed space 12 is obtained.

Through the channel 10 and the closed space 12 extends the discharge duct 20 which is connected to the discharge side of the fan 16 and opens through an aperture 21 provided in the plate 18 into a second channel 22 enclosed by the uprights 17 and 17', the plate 18 and the sides of a plurality filter elements 23 urged against the uprights 17 and 17', it being noted that in the right hand upper corner of the casing as shown in FIG. 1 the filter element is not inserted.

Each one of the filter elements 23 for absorbing aggressive gases can be moved from the front side of the casing into and out of a compartment, each compartment being defined by the beams 24 with fixed thereon guiding strips 25 and posts 26. At the posts 26 pressing means are provided operable by the levers 27 which will be described in detail later, by which pressing means the filter elements are urged against the uprights 17 and 17' for closing the channel 22 for which further, the strips 28 extending between the uprights 17 and 17' are provided so that for each filter element 23 an abutment frame is formed.

At the other sides of the filter elements 23 passageways are formed, for the filter elements 23 at the left hand of the uprights 17, 17', passageway 40 between the sides of the filter elements 23 facing away from said uprights and the plate 9' and for the filter elements at the right hand of the uprights 17, 17', passageway 41 between the sides of the filter elements facing away from said uprights and the side wall 2' of the case. Said passageways 40, 41 are throughout their lengths in open communication with a space 42 (FIG. 2) at the rear side of the casing defined between the rear wall 4 and the rear walls 23' of the filter elements 23, in the rear wall 4 the outlet 30 being provided.

In operation, air is drawn in by the fan 16 through intake 16' which air flows through the intake opening 39 into the space 12 and from said space through the aperture 11, the channel 10 and the aperture 13 into the first compartment where the air flows through the apparatus 14 and 15 to the fan 16 and from the fan 16 through the discharge duct 20 into the second channel 22. From the channel 22 the air flows to the left and to the right through the filter elements 23 in said passageways 40, 41 and from the passageways into the space 42 at the rear wall of the casing and from said space through the outlet 30.

Figure 3:
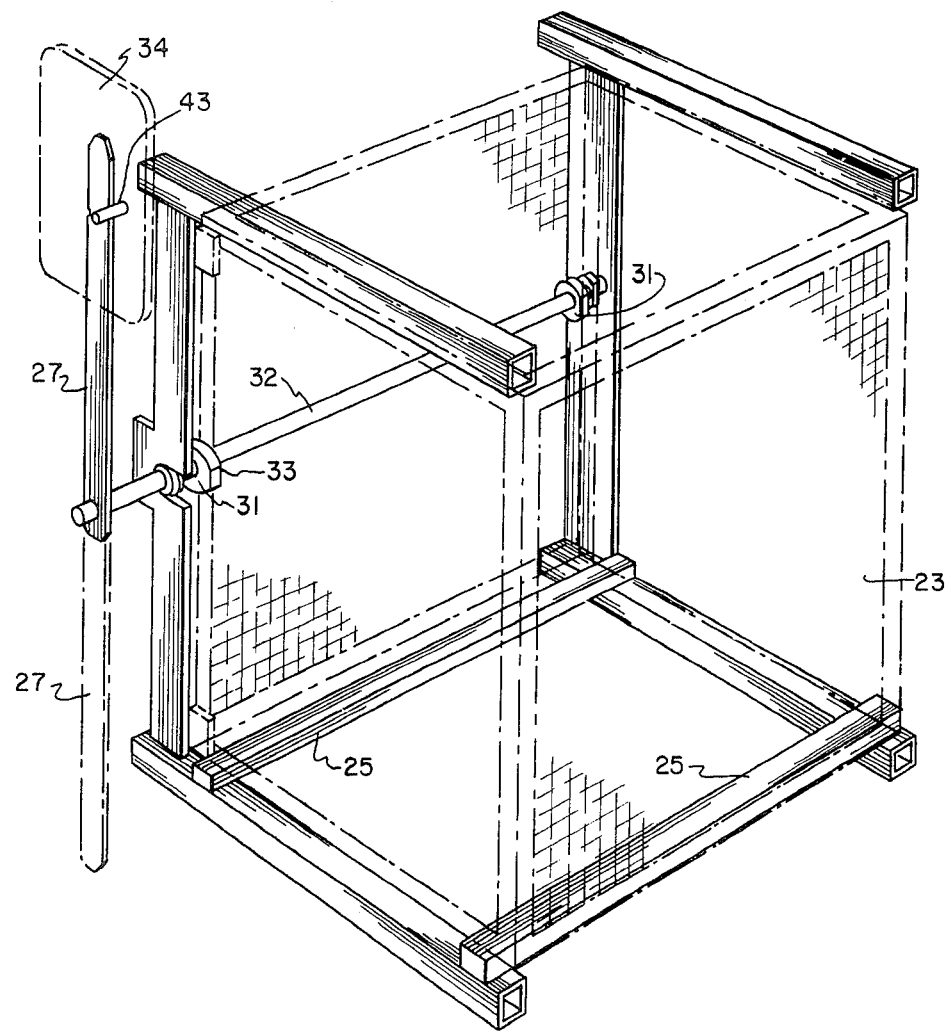
FIG. 3 shows in perspective view and on a large scale the pressing means applied in the casing.

As shown in FIG. 3 the pressing means comprise for each one of the filter elements 23 a set of eccentric discs 31 fixed on a shaft 32 to which shaft the lever 27 is mounted. Each one of the eccentric discs 31 has an abutting face 33 most remote from the shaft 32 in radial direction so that by swinging the lever from the position shown by broken lines to the position shown with solid lines in the direction of the shown arrow, the filter element 23 is pressed tightly against said abutment frame by the eccentric discs. To the doors of which a portion 34 is shown in FIG. 3, projecting stop means 43 is welded, which engages said lever at its backside in the shown locked condition when the doors are closed, so that with certainty the lever 27 is prevented from rotating back by which the filter elements 23 would not be pressed against the abutment frame anymore and air could leak along the filter elements. From FIG. 1 it appears clearly that the respective levers 27 can be rotated to and fro over 180° only in one direction.

We claim:

1. Filter casing for an air conditioning system, comprising, a pair of parallel side walls, a rear wall, an upper wall, a bottom wall, and a front cover, wherein a fan is mounted inside said casing, said fan having a discharge side and an intake side, a first of said walls having an outlet opening therein and said intake side of said fan being in communication with an intake opening in said front cover through a passage within said casing, in said passage is mounted a filter apparatus for filtering intake air received through said intake opening for removing solid particles from said intake air, said casing being divided into a first and a second compartment by a pair of partitions in spaced apart relation parallel to each other and extending between said rear wall and said front cover and extending between said upper and bottom walls, said partitions defining a first channel therebetween, a first of said partitions having an aperture therein open to a space within and closed by plates to said second compartment, said space being open to said intake opening, a second of said partitions having aperture therein wherein said first channel is in communication with said first compartment, a temperature control apparatus for controlling the temperature of said intake air is mounted in said first compartment, said filter apparatus and said fan being located in said first compartment such that said intake air passes sequentially through said temperature control apparatus and said filter apparatus to said fan, the discharge side of said fan being connected to a discharge duct extending through said first channel and said space and opening into a second channel which is parallel to said first channel and within said second compartment, a plurality of absorbtion filter elements in said second compartment for absorbing aggressive gases from said intake air, said second channel being defined by one of said plates and inlet sides of said filter elements, through said filter elements said intake air is permitted to flow from said inlet sides to output sides of said filter elements, which output sides define first and second passageways, said first passageway being defined between the output side of at least one of said filter elements and said first partition and said second passageway being defined between the output side of at least one of said filter elements and one of said side walls, said passageways are throughout their lengths in open communication with a rear space between said rear wall of the casing and sides of said filter elements which face said rear wall, in which rear space said outlet opening opens.

2. Filter casing according to claim 1 wherein said front cover of the casing is at least partially formed by a set of doors so that in an open condition of said doors said filter apparatus and said filter elements may be moved into and out of the casing, pressing means being provided for each of said filter elements by which said filter elements are urged with their respective sides against abutment frames for enclosing said second channel.

3. Filter casing according to claim 2 wherein said pressing means are each formed by a pair of eccentric discs provided on a shaft extending perpendicular to said rear wall of the casing and mounted for a rotational movement, which discs are provided with an abutting face at the location most remote from said shaft in a radial direction, which face can be brought into engagement with an edge of a respective one of said filter elements by rotating the shaft by means of an operating lever provided on the end of said shaft adjacent one of said doors.

4. Filter casing according to claim 3 wherein on the inner side of said door a respective projecting stop means is fixed for each of said levers, which stop means in the closed condition of the door projects in the travel path of its respective lever so that the respective lever is prevented from rotating in the travel path direction in which said abutting faces of said eccentric discs are released from engagement with their respective filter element.

* * * * *